Sept. 23, 1941.　　　　C. R. LIVERMON　　　　2,256,681
FEEDER
Filed July 15, 1939　　　　2 Sheets-Sheet 1
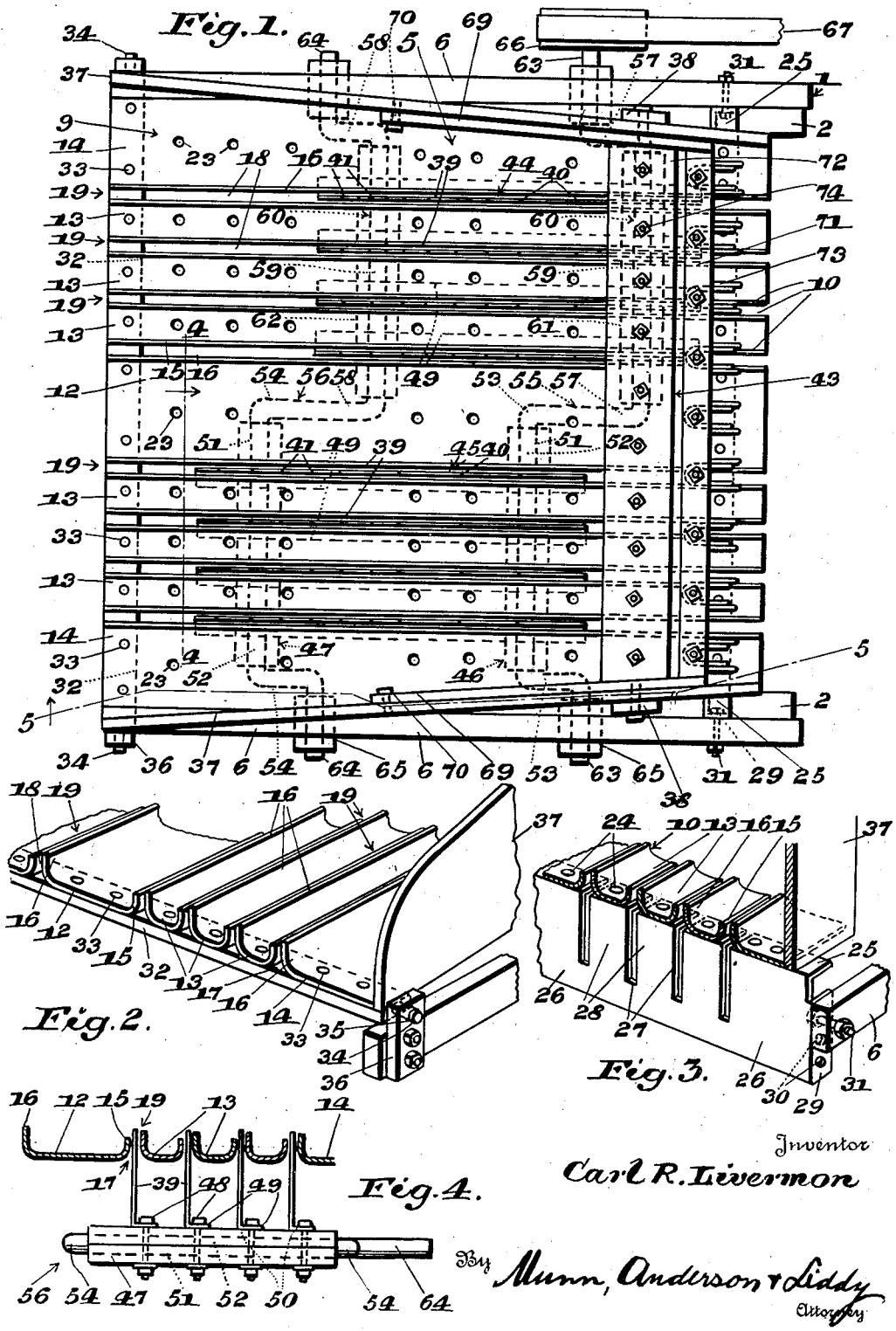
Inventor
Carl R. Livermon
By Munn, Anderson & Liddy
Attorney Sept. 23, 1941.   C. R. LIVERMON   2,256,681
FEEDER
Filed July 15, 1939   2 Sheets-Sheet 2

Inventor
Carl R. Livermon
By Munn, Anderson & Liddy
Attorney

Patented Sept. 23, 1941

2,256,681

UNITED STATES PATENT OFFICE 2,256,681

FEEDER

Carl R. Livermon, Roxobel, N. C.

Application July 15, 1939, Serial No. 284,792

10 Claims. (Cl. 198—219)

This invention relates to improvements in threshing machinery, and more particularly to the feeders thereof. Inasmuch as the instant feeder is primarily intended for use in conjunction with a peanut vine threshing machine, the description is based on that use, but it is to be understood that this is not a limitation.

The commonly known feeder comprises a solid board bottom onto which the vines are forked by a laborer on the ground. The feeder usually has an attendant who stuffs the vines into the feed throat of the picking cylinder, but because of the fact that the feeding depends entirely upon the judgment of the attendant errors are committed right along in the rate of feeding so that the picking cylinder is supplied either with too much material or not enough, and never with a continuous flow.

This defect is overcome by the improved feeder which embodies provisions for automatically controlling the amount of material to be delivered to the feed throat. But an equally important consideration relates to the constant elimination of dirt from the feeder, thereby avoiding the damage which commonly occurs in a threshing machine.

It is readily understood that when the laborer on the ground forks up the vines he also transports to the feed table considerable quantities of dirt which adhere to the roots of the vines. The common type of solid board bottom feed table has no provision for the escape of this dirt. Consequently it goes in with the vines, causing unnecessary wear and tear on the teeth of the cylinder and concave. With the preamble in mind the objects of the invention are as follows:

First, to provide a feeder wherein a continuous cleaning of the feed-table is performed by causing the vine mass to advance with a walking motion, this motion resulting from force impulses imparted to the vine mass on alternately opposite sides of said mass, causing a sweeping of the feed-table by said mass to clear off the dirt accumulations by brushing them along the feed table into the machine.

Second, to supplement the foregoing feed-table with a system of perforations for use in some installations, for sifting out a large percentage of dirt so that less foreign matter will enter the picker and thus reduce the damage which can befall the latter.

Third, to provide a feeder which is predicated on a feed-table bottom along which the vine mass is impelled with a walking motion by the periodic projection of the teeth of groups of carrier blades on alternately opposite sides of the feed-table, the number of blades in each group being sufficient to carry forward that part of the mass directly thereover without cutting through, and each group alternately receding beneath the table so that the portion of the mass on that side is free to rest of its own weight on the then unencumbered side to be dragged along the table bottom with the other portion then in the process of being impelled forwardly.

Fourth, to provide a feeder wherein a sufficiently deep penetration of the carrier blade teeth into the vine mass is assured by the constant sweeping action of the walking vine mass, the uniformity of penetration being the result of keeping the slotted feed table cleared of dirt accumulations.

Fifth, to work the carrier blades in groups or banks thus to provide a large enough number of teeth and at the same time to space the blades sufficiently far apart so as to insure an adequate pushing area to overcome the resistance of tangled vines between a retarding device and the teeth of the blades.

Sixth, to actuate the carrier blade groups with two-throw cranks, the throws of each pair employed being offset in respect to each other so as to avoid the crank-throws reaching dead centers simultaneously.

Seventh, to provide an adjustment for that end of the feed table next to the cylinder, by which to raise or lower the table in respect to the groups of blades, thus to cause the teeth to pass through said table at varying heights and in turn to regulate the carrying capacity of the blades according to varying conditions of the vine mass.

Eighth, to make the carrier blades with sets of coarse teeth nearest the picking cylinder and with sets of finer teeth farthest from said cylinder, respectively, to force the vines forward and to tear them apart against the retarding device, and both to carry forward the vine mass and hold said mass in position, preparatory to being gripped by the corresponding coarse teeth of an adjacent blade set.

Ninth, to provide for the delivery of the vine material to the picking cylinder with a uniform feed, this purpose being accomplished by employing a retarding device to impose a resistance upon the top of the mass while the carrier blade sets carry forward the bottom of the mass toward the cylinder, the combined effect of forwarding the mass at the bottom and holding it back at the top being to tear the mass in the middle and to do so uniformly with each feed stroke of the blade set.

Tenth, to construct the feed-table with a series of parallel cross-sectionally curved metal channels, the upstanding flanges of each of which are spaced so as to define carrier blade passages in which passages the blades are operable, one flange being higher than the other flange on each of the channels so that when high and low flanges are brought together in passage formation their edges will set on a slant and thus prevent peanuts from lodging thereon possibly to work through the narrow entrance slot and thus become lost.

Other objects and advantages will appear in the following specification, reference being had to the accompanying drawings, in which:

Figure 1 is a plan view of the improved feeder.

Figure 2 is a detail perspective view of one corner of the feeder, particularly illustrating one of the pivotal mounts of the slotted feed table.

Figure 3 is a detail sectional perspective view of the adjustable end of said feed table.

Figure 4 is a detail cross section taken on the line 4—4 of Fig. 1.

Figure 5:
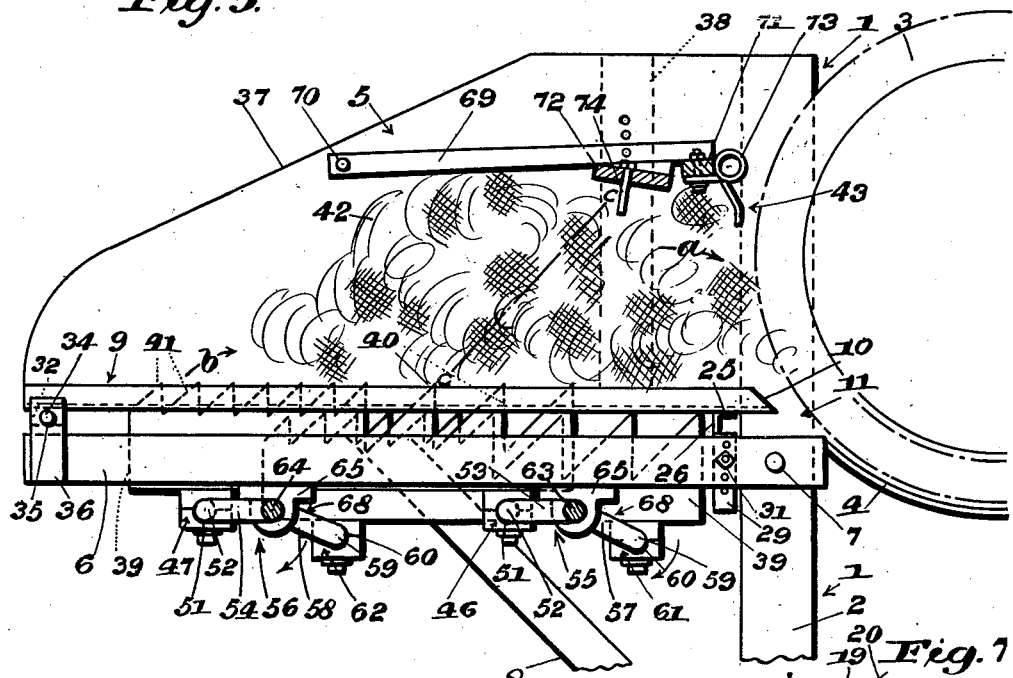
Figure 5 is a longitudinal section taken substantially on the line 5—5 of Fig. 1.

The threshing machine, commonly designated 1, includes the uprights 2, constituting part of the framing, the revoluble picking cylinder 3 and the fixed concave 4. Both the cylinder and concave are equipped with interacting teeth (not shown), the purpose of which is to tear the vines and thus cause a separation of the peanuts.

A feed hopper 5 is mounted on the framework of the machine, the uprights 2 of the latter providing the supports for a pair of parallel and preferably horizontal beams 6. These beams are secured at 7 to the uprights 2, and are braced from the latter as at 8. This structure provides a rigid foundation for the feed table or bottom generally designated 9, said feed table comprising a plurality of metal channels. The feed table 9 is so supported that its discharge edge 10 stands in close proximity to the cylinder 3, and actually defines a part of the feed throat 11 of the latter.

To this end the foregoing edge 10 is beveled, said bevel actually comprising an appropriate angling of the channel flanges adjacently to the cylinder as shown (Fig. 5). The resulting slope takes the general pitch of the periphery of the cylinder 3 and concave 4. The feed table 9 is composed of the plural channels mentioned, there being a central channel 12 which is broader than those channels 13 located between said central channel 12 and the side channels 14. The excess breadth of the central channel 12 is largely an accommodation to cover the area in which the central throws of the cranks work. The side channels 14 serve as fillers between the channel series 13 and the hopper sides, and the former are shaped to match the forwardly (leftwardly) flaring sides. The purpose of the flare is to expand the feed table area at the left entrance end.

The channels 12, 13 and 14 have upstanding flanges 15 and 16. The reason for the distinction in numerals is that the flanges 15 are short while the flanges 16 are long. Said channels are made like gutters. The bottom parts are rounded more or less, and the upstanding flanges into which the curvatures merge are parallel to each other or substantially so. The flanges are spaced as shown, defining the passages 17 in which the carrier blades work. The upright flanges comprise considerable areas against which the carrier blades can rub under the stresses of machine operation. Because of the fact that said areas are large the perceptible wear is very small with a consequently increased endurance over what the latter would be if the structure were arranged otherwise.

Figures 6, 7:
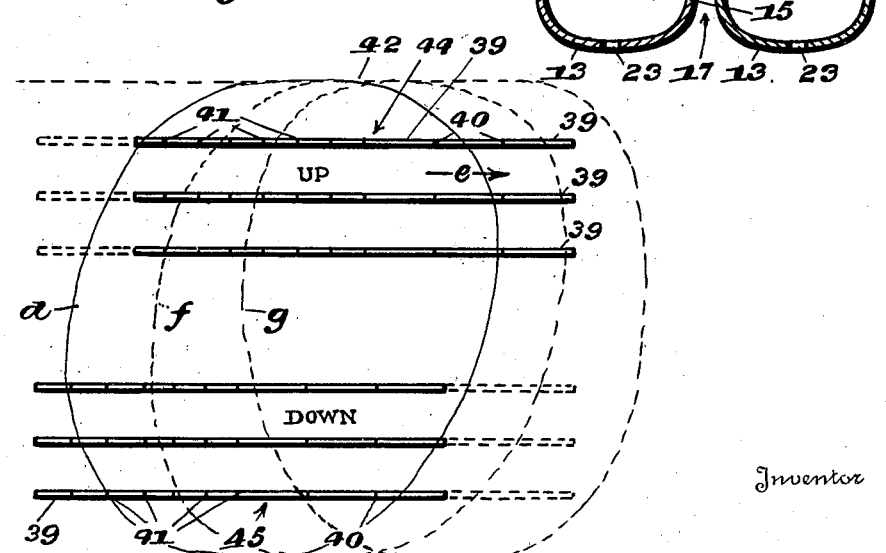
Figure 6 is a diagram illustrating the walking or shuffling motion imparted to the vine mass by the operation of the carrier blade groups.
Figure 7 is a detail cross section illustrating a feature later described.

The foregoing spacing of the channels 12, 13 and 14 defines slots 18 along the ridges 19 of what could be called ribs. The socalled ribs are the product of the contiguously placed flanges 15, 16 and since one of these is taller than the other it follows that the slotted ridge will stand obliquely to the level of the table as denoted by the line 20 (Fig. 7).

If the flanges 15, 16 were of a uniform height it would be possible for a large percentage of peanuts, especially the small ones, to fall through the slot because the flange edges would define a sufficiently broad and level base to receive the peanuts. But by making the flanges uneven (Fig. 7) the tallest one acts as a deflector, and any peanut falling in the direction of the ridge 19 will in most instances strike the tall flange first and thus direct the peanut off onto the table as denoted by the arrow $i$.

This would be true in most cases of peanuts small enough to drop through the slot, but the deflecting function of the tall flange is so effective that it is actually possible to make the slot 18 broader than with uniformly high flanges, thus to give the carrier blades more clearance. A preferable form of both flanges is to carry the curvature up to a substantially common level 21 (Fig. 7) then to continue the flanges straight in the manner previously described.

The feed table 9 is desirably perforated to let a large percentage of the dirt sift through. The perforations are designated 23 and they are formed in the webs of the channels 12, 13 and 14. However, the use of perforations is optional and in some installations they may not be required.

In further reference to the details of the feed table 9, the channels 12, 13 and 14 are secured at 24 to the bends 25 of a head plate 26. This is deeply slotted at 27 to provide for the clearance of vines so that they will not hang in the carrier blade passages 17 beyond the rear limits of access by said carrier blades. The plate members 28 resulting from the slotting have their top ends formed into the bends 25. Flanges 29 are turned back from the ends of the plate 26. The channels extend back farther than the securements 24 so that the previously mentioned discharge edge 10 is situated fairly clear of the plate 26.

The foregoing provision for adjustment comprises a series of apertures 30 in each of the flanges 29, and a bolt 31, which is fitted through the desired one of the respective apertures and through a hole in the adjacent horizontal beam 6. This arrangement for adjustment is extremely simple and yet quite effective. It is not necessarily adhered to in practice because there is a variety of equivalents which will work just as well.

When any adjustment is made the feed-table 9 will swing on its pivotal mount (Fig. 2). This mount comprises a bar 32 to which the channels are secured at 33 at the entrance end of the feed-table. This bar has pintles 34 (Fig. 2) which are turnably mounted in holes 35 in upstanding fixtures 36 secured to the horizontal beams 6. The hopper 5 includes retainer sides 37 which are affixed in the forwardly flaring positions previously mentioned (Fig. 1) in any appropriate way, the arrangement for the affixation including members 38 which are rigidly secured at their bottom ends to the sides of the outermost channels 14 and extend upwards therefrom.

Thus far it will be understood that the feed-table 9 comprises an improved substitute for the currently used feed-table. The distinction between the two is that the latter comprises a solid board bottom, whereas the former comprises a series of channels, spaced apart to provide carrier blade passages. Another distinction is that the instant feed-table 9 is adjustable at its throat or discharge edge, and necessarily so in order to cause the teeth of the carrier blades to pass through the table at varying heights.

All of the carrier blades are alike, and the description of one will suffice for all. The carrier blade 39 is characterized by having a series of coarse teeth 40 adjacent to the picking cylinder 3, followed by a series of finer teeth 41. The coarse teeth serve to force the vine mass 42 toward the throat 11 (arrow a, Fig. 5), for which purpose they grip much more deeply into the vines than do the teeth 41. The latter are primarily for the purposes of carrying the vine mass 42 up to the later described retarding device and holding said mass there preparatory to its being gripped by the coarse teeth of the adjacent blade set. Emphasis is laid on the aforesaid carrying forward of the vine mass by the teeth 41, it being this positive carrying forward of the mass on one side of the feed table which is instrumental in dragging the mass along the feed table on the other side.

A further function of the heavy teeth 40 is to tear the vine mass apart substantially along the line c—c (Fig. 5). The tearing act requires the cooperation of a retarding device 43, the details of which are presently described.

A sufficient number of blades 39 is provided to furnish a large enough number of teeth, both coarse and fine, to do the intended work. To this end the blades are separated into groups or sets. These groups are designated 44, 45, in Fig. 1, and each is shown to comprise four carrier blades 39. Obviously the number of blades and the number of groups can be increased provided that each group represents the outline of a sufficiently large table area to insure the gravitation of the superimposed portion of the vine mass into a resting position on said area while the respective blade-teeth are withdrawn, and while the adjacent portions of the vine mass are in progress of being advanced by the then active carrier blade teeth. This principle is especially well understood in the case of making the blade groups too narrow in the twin group arrangement in Fig. 1 or in a conceivable triple or other multiple group arrangement not disclosed.

If the blade group in any such installation is too narrow there will not be table space enough to let the vine mass down. Consequently it will arch above the table surface, allowing a building up of a dirt layer which is equivalent to so increasing the thickness of the table that the blade teeth will barely show through at the highest point in their orbits, thus to eventually defeat the forwardly function of the carrier blades.

The blades in group 45 are secured in upright positions to bearing blocks 46, 47, by means of bolts 48 which go through the angled footings 49 of the carrier blades and through holes in the halves of the bearing blocks. The bolts thus serve two purposes, respectively to hold the halves together and the blades down on the blocks. Said blocks are made long enough to carry all of the blades at one end of said group assisting in the accurate registration of the carrier blades in the table slots. Any necessary adjustment of an individual blade is made at a slot 50 in its footing. The footings 49 span the distance between the blocks 46, 47 (Fig. 1), thereby strengthening the carrier blades.

The bearing blocks 46, 47, are bored longitudinally at 51 to turnably contain the respective wrist pin 52. The bolts 48 are employed in pairs at each place of securement of the carrier blades and said bolts pass through the block halves at opposite sides of the wrist pin.

It is these pins which connect the crank throws 53, 54 (Fig. 1). Each crank 55, 56, is a two-throw crank, the companion throws being designated 57, 58. These throws are likewise connected by wrist pins 59. Said wrist pins turn in bores 60 in bearing blocks 61, 62. The bearing blocks 61, 62 carry the blades 39 of the group 44 in the same manner as do the blocks 46, 47 of the group 45.

The axles 63, 64 of said two-throw cranks are journaled in bearings 65 which are suitably attached to the parallel beams 6. The axle of one of the cranks is made longer than the other (Fig. 1) in order to carry a pulley 66. This pulley is adapted to be driven by a belt 67. In practice the pulley and belt can be substituted by a sprocket and chain.

An outstanding characteristic of the throws of one of the cranks, for example the throws 53, 57 of the two-throw crank 55, is the fact that these throws are offset as at 68 (Fig. 5). The extent of the offset is about 15 degrees although this dimension is subject to variation. The underlying purpose of the offset is to avoid the throws of any pair of cranks from reaching dead centers simultaneously. Incidentally, the carrier blades act as connecting rods between the cranks.

Attention is now directed to the retarding device 43 (Fig. 5). This comprises a pair of arms 69, the outer ends of which are pivoted at 70 to the retainer sides 37. The inner ends are connected by bars 71, 72. The outer bar 71 carries a series of spring fingers 73 which are desirably made double (Fig. 1) but not necessarily so. The innermost bar 72 carries a series of rigid spikes 74. The fingers and spikes are directed downwardly as shown. Consequently they stand in the way of the mass 42 and project thereinto a sufficient extent to retard the mass and permit the tearing action previously described as occurring along the line c—c.

The operation is readily understood. When a given setting of the feed table 9 is adopted, that setting is generally retained until local conditions make it necessary to slightly alter the setting for a greater or less penetration of the carrier blade teeth into the vine mass 42. Said mass carries a fairly large amount of dirt with it. This dirt gravitates upon the feed-table 9 and in the instance of the prevailing types of feed-tables, is worked in with the vines to the mechanism of the threshing machine.

As brought out before, one of the outstanding improvements in the instant feeder is keeping the table fairly clean and to make sure of a constantly uniform infeeding of vine material into the feed throat 11. This is accomplished by the peculiar sweeping action of the vine mass in turn made possible by the manner of working the carrier blades.

In Fig. 6 the mass in any given sequence of steps can be regarded as initially occupying the position d. At this moment the blade group 45 is down and temporarily inactive while the group 44 is up and active upon the vine mass. Said group can be considered as completing a forward thrust in the direction of the arrow e, and as it does it drags the whole mass forwardly to the position f. The mass sweeps the table area over the suppressed carrier blade group 45 because of that portion of the mass having been permitted to gravitate into contact with the table.

As the action progresses the blade group 45 will rise above the table while the group 44 will go down. The vine mass then gravitates into contact with the table top on that side. But the now active group 45 will grip the mass and move it forwardly to the position g, thus repeating the function of the blade group 44.

The whole underlying principle is to grip the vine mass on alternately opposite sides and actively push the mass on said alternately opposite sides, the then loose or disengaged side of the mass dragging the area of the temporarily suppressed blade group. All this is to the purpose of sweeping the table top of dirt by letting the vine mass down into contact with the table top and making sure that the latter will be loaded with vine material and not a layer of dirt.

The function of the retarding device 43 is to hold back the surplus vine material at the top of the mass while one or the other of the two blade groups tears off portions from the bottom of the mass. As previously stated the line of cleavage is approximately along the zone c—c, thus to feed the picker cylinder with a constantly uniform quantity of material from beneath said zone; the surplus material overriding the zone c—c will fall forward onto the carrier blades to be driven into the feed throat.

I claim:

1. A feeder for a threshing machine comprising a slotted feed-table, a pair of groups of carrier blades situated on the respective sides of the longitudinal center of the feed-table, the blades being in registration with the passages defined by the slots, a pair of two-throw cranks revolubly mounted below the feed-table, bearing blocks substantially equal in length to the width of the throws and being journaled on said throws, the bearing blocks of identically and longitudinally positioned pairs of throws having the respective groups of blades affixed thereto in parallelism so that each longitudinal pair of throws carries a symmetrical blade group, and means for revolving one of the cranks, imparting simultaneous revolution to the other crank through the connection afforded by the respective blade groups, thereby imparting a circular motion to said groups in said passages to act upon a superimposed vine mass with intermittent and alternating pushing motions.

2. A feeder for a threshing machine comprising a slotted feed-table, a carrier blade group on each side of the longitudinal center of the feed-table, the blades being in registration with the passages defined by the slots, pairs of cross bearing blocks to which the respective groups are attached, a pair of axles journaled crosswise of and below the feed table for the actuation of the blade groups, and diversely set pairs of cranks in each of the axles, including wrist pins connecting the cranks and having the bearing blocks mounted thereon, the pair of cranks extending to one side of the respective axle being offset from the pair of cranks extending to the other side to prevent the dead centering of the cranks.

3. In a feeder, a channeled feed-table, the channels being separated to provide movable-blade passages, the channels having pairs of flanges, one flange being tall and the other short, the tall flanges being in confronting but spaced relationship to the short flanges of successive channels to define oblique bases, the tall flanges acting as deflectors.

4. In a feeder, a channeled feed-table, the channels being separated to provide movable-blade passages, the channels being cross-sectionally rounded and having erect flanges merging with the curvatures of the channels, the flanges of adjacent channels being spaced apart to define said passages and being alternately short and tall to provide slanting tops to the ridges resulting from the assemblage of the flanges.

5. A feeder for a threshing machine comprising a channeled feed table, said channels having perforations for the sifting through of dirt, at least two groups of toothed forwarding devices working in conjunction with each other to forward a vine mass along the ridges of said table channels incidentally to loosen the dirt, and means actuating said devices with a vine-advancing motion, each of the devices alternately acting above the table to grip the mass and impart a positive push thereto, the companion to said active device then being inactively depressed below the channel ridges, clearing a table area corresponding in size to the inactive device for the unrestricted dragging of the mass thereby to sweep the dirt through the perforations.

6. A feeder comprising a slotted feed table, essentially thin, toothed carrier blades operable up through the slots, means securing multiple blades into at least two groups respectively for operation on opposite sides of the longitudinal center of the feed table, each group consisting of an approximate minimum of three blades, the actual numerical requirement being a factor directly related to the density of a tangled vine mass intended to be conveyed, thus to avoid cutting through the mass and at the same time delineating a table area for exposure by each inactive group, of sufficient expanse to let the superimposed mass drop into contact with the table, means to alternately reciprocate the blade groups to actuate the mass with a combined advancing and sweeping action, and mass-retarding means fixedly stationed above the feed table, consisting of twin rows of successive spikes and spring fingers, said blades having coarse teeth grouped under the retarding means to confine major penetration of the mass to the locality of said means, and relatively fine teeth grouped in advance of the retarding means merely carrying said mass up to said means.

7. A feeder comprising a feed table, vine mass retarding means fixedly situated and spaced above said feed table, said means consisting of twin rows of successive spikes and spring fingers directed toward the mass and spaced in the direction of movement of said mass, and orbitally movable groups of carrier blades operable through said feed table, each of the blades having plural series of teeth of varying carrying capacity grouped transversely of the feed table, the teeth of major carrying capacity being in the approximate region of the retarding means.

8. A feeder comprising a feed table, said table having slots to define passages, a retarding device stationarily situated above the feed table, said means consisting of twin rows of successive spikes and spring fingers directed toward the mass and spaced in the direction of movement of said mass, orbitally movable toothed carrier blade groups operable in said passages to periodically project therethrough above the feed table, said blades having coarse teeth grouped under the retarding device and relatively fine teeth grouped in advance of said retarding device, a pivot for that end of the table remote from the retarding device, and means contiguous to the retarding device for adjusting the table on its pivot thereby to vary the feeding effect of the coarse teeth without materially changing the carrying effect of the fine teeth.

9. A feeder comprising a feed table, said table having slots to define passages, a retarding device stationarily situated above the feed table, said means consisting of twin rows of successive spikes and spring fingers directed toward the mass and spaced in the direction of movement of said mass, orbitally movable toothed carrier blade groups operable in said passages to periodically project therethrough above the feed table, said blades having coarse teeth grouped under the retarding device and relatively fine teeth grouped in advance of said retarding device, a pivot for that end of the table farthest from the retarding device, and means contiguous to the retarding device for adjusting the table on its pivot, the resulting angular setting of the table causing a greater variation in the exposure of the coarse teeth than of the fine teeth above the feed table thereby to vary the feeding effect of the coarse teeth without materially changing the carrying effect of the fine teeth.

10. A feeder for a threshing machine comprising a slotted feed-table, a two-throw crank arrangement revolubly mounted crosswise of the underside of the feed-table, at least two blade-groups respectively connected with matching throws of said arrangement to perform alternating rising and falling motions in respect to the table surface, each group consisting of thin, toothed blades, in sufficient numbers and in fixedly related lateral assemblage to provide a non-cutting vine mass-forwarding support and at the same time demarcate a potential table area broad enough to insure a gravitation of the superimposed portion of the vine mass to the table surface upon falling of the respective group below said surface while the other vine mass portion remains sustained above said surface by the other blade group.

CARL R. LIVERMON.